US008991150B2

(12) United States Patent
Verhulst et al.

(10) Patent No.: US 8,991,150 B2
(45) Date of Patent: Mar. 31, 2015

(54) HIGH SPECIFIC IMPULSE SUPERFLUID AND NANOTUBE PROPULSION DEVICE, SYSTEM AND PROPULSION METHOD

(75) Inventors: Michael Wallace Verhulst, Springfield, IL (US); Joseph D. Nix, Fort Wayne, IN (US); Christopher W. Smith, Birmingham, AL (US)

(73) Assignee: Board of Trustees of Northern Illinois University, DeKalb, IL (US)

( * ) Notice: Subject to any disclaimer, the term of this patent is extended or adjusted under 35 U.S.C. 154(b) by 598 days.

(21) Appl. No.: 13/560,111

(22) Filed: Jul. 27, 2012

(65) Prior Publication Data

US 2014/0026535 A1    Jan. 30, 2014

(51) Int. Cl.
*B63H 11/00* (2006.01)
*F02K 9/00* (2006.01)
*F02K 9/42* (2006.01)

(52) U.S. Cl.
CPC .... *F02K 9/00* (2013.01); *F02K 9/42* (2013.01)
USPC .............................. 60/200.1; 60/204; 60/221

(58) Field of Classification Search
CPC ............ F02K 9/42; F02K 9/425; F02K 9/50; B64G 1/26; F03H 99/00; F03H 1/0006; F03H 1/0081
USPC ................ 60/200.1, 204, 221, 257, 258, 259, 60/39.462, 203.1
See application file for complete search history.

(56) References Cited

U.S. PATENT DOCUMENTS

| | | | |
|---|---|---|---|
| 4,585,191 A * | 4/1986 | Blount | 244/169 |
| 4,713,942 A | 12/1987 | Hofmann | |
| 4,956,976 A | 9/1990 | Kral et al. | |
| 5,220,800 A | 6/1993 | Muller et al. | |
| 5,397,901 A | 3/1995 | Lo | |
| 5,454,163 A | 10/1995 | McDonald et al. | |
| 5,641,424 A | 6/1997 | Ziolo et al. | |
| 5,657,635 A | 8/1997 | Benoit et al. | |
| 6,282,920 B1 | 9/2001 | Nacher et al. | |
| 6,581,452 B2 | 6/2003 | Nakano et al. | |
| 7,306,316 B2 | 12/2007 | Doak | |

OTHER PUBLICATIONS

Rodney Andrews et al., "Nanotube Membranes: Super Fast Flow in Very Small Pipes," Energeia, CAER—University of Kentucky, Center for Applied Energy Research, vol. 17, No. 2, 2006, pp. 1-6.

* cited by examiner

*Primary Examiner* — Ehud Gartenberg
*Assistant Examiner* — William Breazeal
(74) *Attorney, Agent, or Firm* — Drinker Biddle & Reath LLP

(57) ABSTRACT

A propulsion device including a chamber that stores a superfluid, a substrate coupled to a portion of the chamber, a plurality of orifices extending through the substrate, each of the plurality of orifices having a first end and a second end opposite the first end, the first end disposed in an interior of the chamber and the second end disposed outside the chamber; and a pressure source that generates a pressure differential between the first end of each of the plurality of orifices and the second end of each of the plurality of orifices.

8 Claims, 9 Drawing Sheets

009
HIGH SPECIFIC IMPULSE SUPERFLUID AND NANOTUBE PROPULSION DEVICE, SYSTEM AND PROPULSION METHOD

TECHNICAL FIELD

This invention relates to the field of propulsion systems and methods, more specifically the field of rocket propulsion systems using a superfluid as a propellant together with orifices provided by nanotubes to generate thrust.

BACKGROUND

In the field of propulsion systems that can be used for rockets, missiles, spacecrafts, and any type of thrust drives, the different technologies that are currently available for providing the propulsion can be categorized into different propulsion technology families. The families that contain most rockets propulsion systems that are in use today, or planned to be in use in the near future, include chemical rockets, physical powered rockets, electric propulsion rockets, nuclear rockets, and laser/ablative propulsion rockets. These families of propulsion systems have characteristics that are particular to the family.

For example, chemical rockets use chemistry to create an exothermic reaction in the propellant, which causes the propellant to heat up and expand, generating thrust on a vehicle. This heated propellant, a gas or plasma, uses the heat released by the reaction to expand. This expansion pushes against a nozzle attached to the vehicle. This push, acting to separate the reacted propellant from the vehicle is the mechanism of momentum transfer, which provides for the motion of the rocket. Chemical rockets come in many varieties, such as solid rockets, liquid rockets, hybrid rockets, mono/bipropellant rockets, and others. Chemical rockets similarly vary widely in complexity, size, and cost. Chemistry is one of the oldest, and most well understood of the basic sciences behind propulsion mechanisms. This is one reason why chemical rockets are the most prevalent of all rockets in use today. The raw materials that comprise the propellants are also quite abundant. Also, chemical propulsion systems are noted for their large size, high thrust, and average specific impulse (Isp). These aspects, coupled with the energy density of some chemical reactions, allow chemical rockets to provide comparatively cheap means for generating a large amount of thrust, which is necessary to launch from Earth or any other potential launching point.

Physical rockets use the same principle of basic chemical rockets, i.e., having a propellant pushed out of the rocket by its own energy. The difference is that the energy does not come from a chemical reaction, but a physical one. Such reactions include phase changes (liquid to gas) and pressure changes. These reactions tend to be far less energy dense than most reactions used by chemical rockets. Physical rockets, however, tend to have very low thrust, very low Isp, and low efficiencies. For this reason these rockets are mainly used in model rocketry, and rarely used commercially.

Electric propulsion rockets are characterized by powering the ejection of propellants with a power supply that is kept on the vehicle, and not, as opposed to chemical rockets, stored in the propellant itself. To at least some extent, this limits the total momentum transferred to the rocket by the propellant. As opposed to a chemical rocket, that can be any size by simply adding more propellant, an electric propulsion rocket has a maximum amount of propellant it can carry because it has a limit to the mass of the power supply. Thus, the use of an electric propulsion system is determined in part by its power supply, not just its propulsion mechanism.

Electric propulsion rockets vary wildly in their construction, and in their operating principles. They do not have to rely on a chemical reaction for their energy, instead it is often stored in something akin to a battery, and so, they have the freedom to use this electrical potential energy in many ways. The complexities of electromagnetism allow for a large number of possible ways to take an electric potential and use it to transfer momentum to something. In most cases, electric propulsion rockets expel low amounts (low mass) of high temperature gases or plasmas at very high speeds. This results in low thrust and high Isp, both incomparable to chemical rockets, the first worse, the second better. The amount of thrust that typical electric propulsion systems can produce is generally not high enough to be able to launch a rocket from Earth to orbit, though their high Isps allow for low mass fractions (larger payload mass and smaller fuel mass) and thus longer term missions. Though it is not practical to launch this kind of system from the ground, once in space, this kind of system can be used for correcting satellite trajectories, deep space missions for probes, and orbit changing. The use of electric propulsion systems in such situations is quite practical and even well proven.

Nuclear rockets have the option to either carry their power in a battery like device, such as a radioisotope thermoelectric generator, or other nuclear reactor, or to carry their power in their propellant, by ejecting small pellets that are to undergo nuclear fission, fusion, annihilation, or a combination thereof. Essentially, this means that nuclear rockets may invoke the complexities of chemical or electric rockets, or both, to cater to a specific goal. As power supplies, nuclear generators and reactors have the possibility to be hugely more energy dense than other electric propulsion power supplies, but this is at the cost of an increased complexity, and the problem of having to deal with getting rid of the excess heat generated by the nuclear power supplies. If pellets of nuclear fuel are detonated to deliver thrust, then these pellets, having reactions with a much higher energy density than chemical reactions, have the ability to be effective interplanetary engines, and have enough thrust to launch from Earth. Nuclear rockets in general, have high Isp and variable thrust to fit the requirement of the application.

The drawbacks to their implementation are their reasonable complexity, albeit simpler than many electric rockets, heat management, safety when using near Earth or in Earth's atmosphere, environmental issues due to radiation, and animate public concern and distrust. Laser, ablative, and beamed energy propulsion systems have rarely been implemented, and have undergone primarily only small scale laboratory testing. They store their energy somewhere outside of the rocket, beam it to the rocket, and use it there. How these devices use it varies greatly. As such, there is no characteristic thrust or Isp for these types of systems, but what is characteristic is the difficulty in beaming energy to a rocket. These technologies are still in early research stages. They are numerous other type of spacecraft propulsion systems and space access that have been discussed in the literature, but many of these proposals have one, or more often many, technological problems and, therefore, are not ready to be implanted in actual flight hardware.

Regardless of all these existing propulsion system technologies, for decades the field of high-performance spacecraft propulsion system research has seen very little beneficial advancement. There is still a strong need for better propulsion systems.

SUMMARY OF THE INVENTION

One aspect of the present invention provides a novel propulsion device and a novel propulsion system. Preferably, the propulsion device includes a chamber that stores a superfluid; and a substrate coupled to a portion of the chamber. Moreover, the device further preferably includes a plurality of orifices extending through the substrate, each of the plurality of orifices having a first end and a second end on the opposite end of the tube from the first end, the first end disposed near an interior of the chamber and the second end disposed near an exterior of the chamber; and a pressure source that generates a pressure difference between the first end of each of the plurality of orifices and the second end of each of the plurality of orifices.

Another aspect of the present invention provides a novel method of propulsion. Preferably, the method includes a step of providing a plurality of nanotubes, and a step of pressurizing a superfluid. Moreover, the method further preferably includes a step of providing the pressurized superfluid to a first end of each of the plurality of nanotubes so that the superfluid imparts thrust at a second end of each of the plurality of nanotubes.

The present invention proposes a radically new design for a propulsion system, for example, but not limited to, rockets, satellite thrusters, missiles, with many advantages over existing rocket propulsion technology. The invention takes advantage of several physical effects that have never before been used in synergy and in the proposed configuration, to create a novel high efficiency propulsion system capable of having higher thrust and higher specific impulse. The invention therefore offers noticeable improvements in terms of performance. In addition, it uses less toxic or volatile fuel, it has the potential to open up an entirely new field of spacecraft propulsion applications and methods.

The proposed propulsion system solves many problems related to existing propulsion systems and improves performance and payload mass fraction. The system is smaller both in mass and in volume as compared to most existing propulsion systems, and can reduce the cost of launching a rocket. Thereby the system can also reduce the costs to access to space or Earth orbit as compared to conventional propulsion system. Also, the system can reduce the toxicity of rocket exhaust, and at the same time increases safety, for example as compared to propulsion systems that use highly volatile chemicals in a combustion process. Moreover, the system increases the number of possible locations on the surface of the Earth which can be used for spacecraft launch because the relative efficient gain of choosing to launch from a location closer to the equator is lessened.

The summary of the invention is neither intended nor should it be construed as being representative of the full extend and scope of the present invention, in which additional aspects, features and advantages will become more readily apparent from the detailed description, particularly when taken together with the appended drawings.

BRIEF DESCRIPTION OF THE DRAWINGS

These and other features, aspects and advantages of the present invention will become better understood with regard to the following description, appended claims, and accompanying drawings where:

Herein, identical reference numerals are used, where possible, to designate identical elements that are common to the figures. Also, the images in the drawings are simplified for illustrative purposes and are not necessarily depicted to scale.

DETAILED DESCRIPTION

The current state of the art in propulsion systems for rockets and spacecrafts are limited by the specific impulse and thrust that can be achieved primary due to specific energy and material property restrictions. For example, for chemical-reaction based propulsion systems, in order to increase the specific impulse, one must increase the temperature of the chemical reaction. This is often limited by the metallurgical properties of the nozzle such as weight, heat capacity, and melting temperatures. However, the present propulsion system 100 does not have these same restrictions because there is no such chemical reaction that needs high temperatures to achieve any higher Isp.

Figure 1:
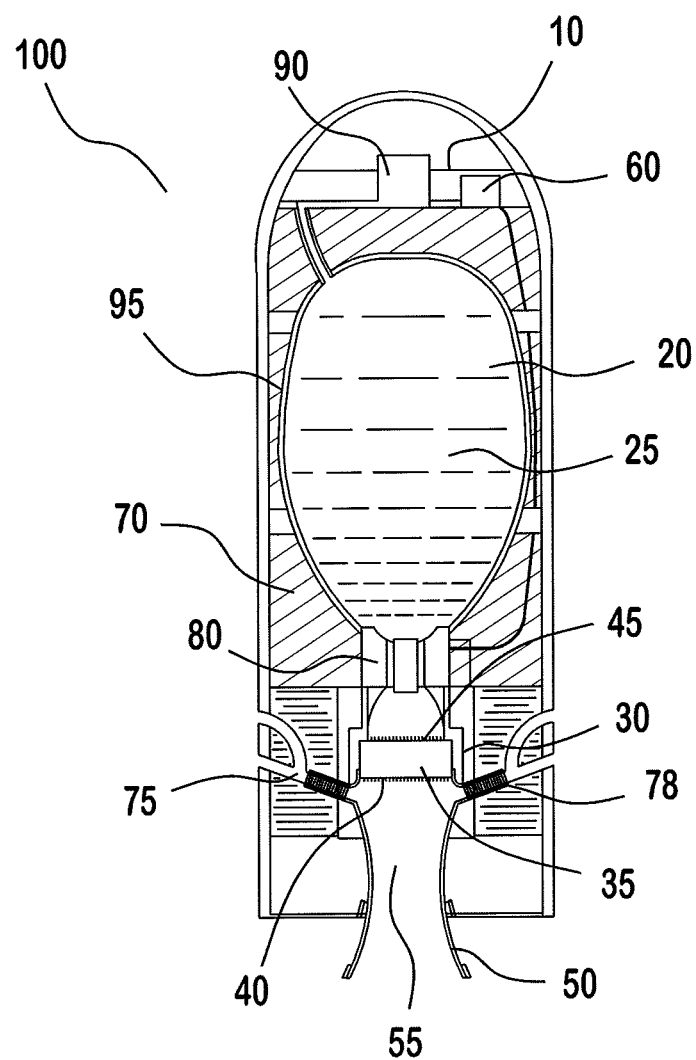
FIG. 1 depicts a schematic representation of the propulsion system in a rocket fuselage.

FIG. 1 shows a schematic representation of the high specific impulse superfluid and nanotube propulsion system (HSISNP) 100 in a rocket fuselage according to the present invention. A sealed chamber 20 is provided in a rocket fuselage 10, the sealed chamber 20 preferably includes a helium-4 superfluid 25. At one end of the sealed chamber 20 in a wall of chamber 20, a CNT membrane 30 is provided that includes CNT matrix 40 having tens or hundreds of billions of vertically aligned carbon nanotubes 45 arranged thereon, held together by substrate 35. An entrance side of the CNT matrix 40 is located inside the sealed chamber 20 so that entrance openings 47 of nanotubes 45 are facing the helium-4 superfluid 25, and the exit side is located in the lower fuselage in an upper area of the thruster 50, so that exit openings 48 of nanotubes 45 are facing the thruster. Each nanotube 45 of the CNT matrix 40 provides a small channel of nanoscopic dimensions which form small orifices that allow helium-4 superfluid 25 to pass through from chamber 20 to thruster 50. The flow of helium-4 superfluid 25 from chamber 20 to thruster is also controlled by superfluid valve system 80 that can shut off any helium-4 superfluid from passing through CNT matrix. In addition, a power supply 90 is arranged in the fuselage 10 that is configured to pressurize chamber 20. Power supply 90 can be configurable and replaceable depending on the use of fuselage and the mission specs, and can include, but is not limited to an electric battery, a nuclear reactor, etc.

The system 100 is not limited to the use of helium-4 superfluid, other types of superfluids can also be used such as helium-3 superfluid, or any other yet to be discovered superfluids that exist at suitable temperatures and pressures that can pass through CNT matrix 40. However, there are superfluids that are not suitable for system 100, because they do not exist at usable temperatures or pressures, such as the superfluid that exists within a neutron star.

Moreover, chamber 20 is sufficiently thermally isolated that the fuselage 10 can be fueled up with helium-4 superfluid 25 before the use, and the critical temperature for helium-4 superfluid is maintained, with chamber 20 being made of an insulating material, and additional insulating filler 70 in fuselage. Until the use of helium-4 superfluid 25 is used for propulsion, chamber 20 is not actively cooled for up to a predetermined period of time. Alternatively, it may be possible that the chamber 20 is actively cooled by a cooling source (not shown). A controller 60 that can be configured to communicate with a remote control station can control the power supply 20 for pressuring the chamber 20, and the superfluid valve system 80 to open or close the valve so that the generation of thrust can be controlled. Controller 60 can be equipped with a timer to activate the power supply 20 and superfluid valve system at specific precalculated times. Also, controller 60 can be connected to various sensors measuring pressure in chamber 20, temperature of chamber, etc. In case a cooling system is present in system 100, the controller 60 could also control the cooling system.

Figure 2:
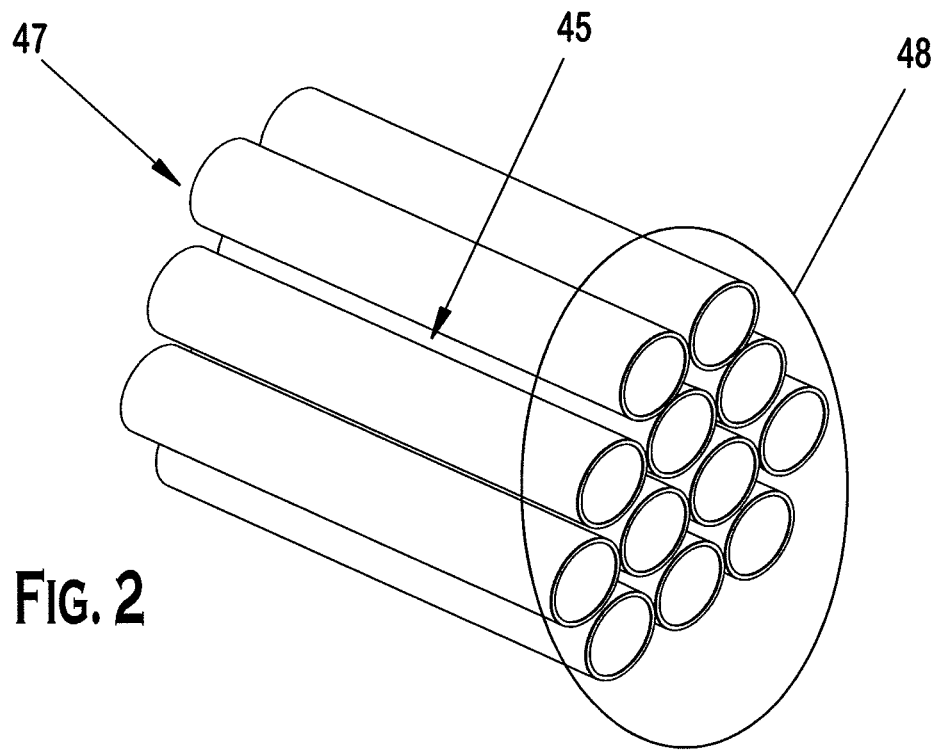
FIG. 2 depicts a schematic perspective top side view of a matrix of nanotubes that can be used for the propulsion system.
Figure 3:
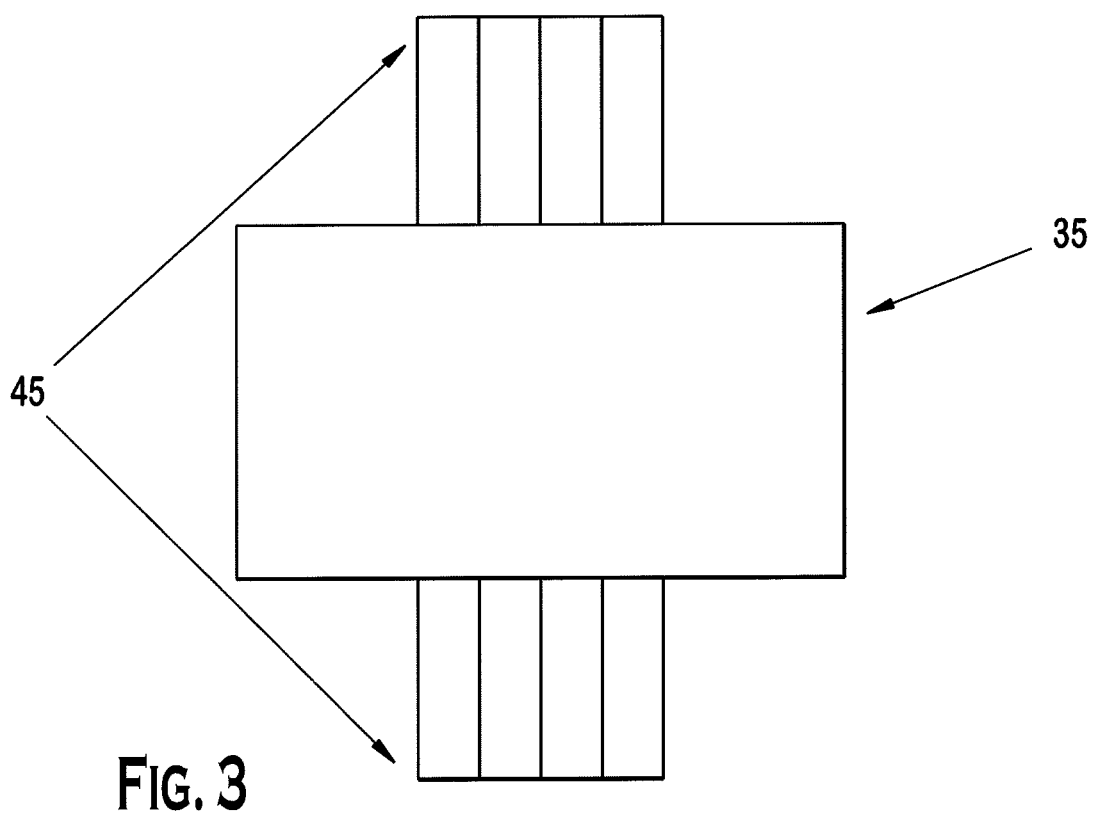
FIG. 3 depicts a schematic top plan view of the substrate having a matrix of nanotubes, in which the substrate is traversed by nanotubes that can be used for the propulsion system.
Figure 4:
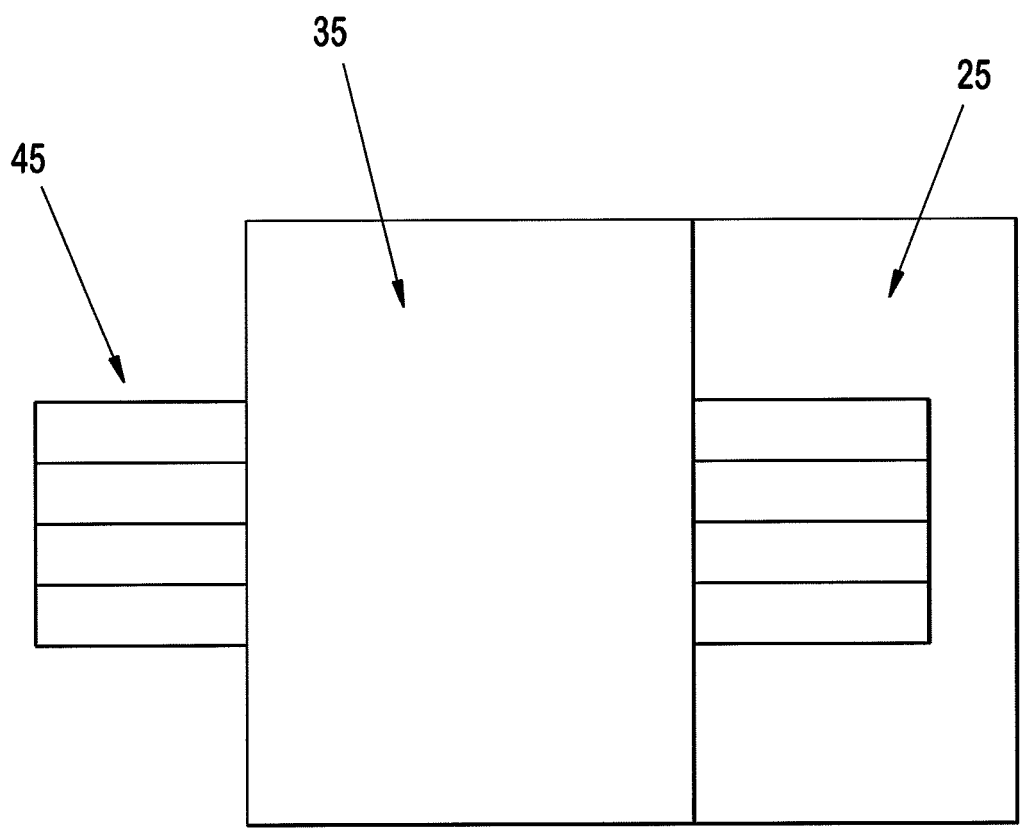
FIG. 4 depicts a schematic top plan view of the substrate having a matrix of nanotubes with superfluid arranged at the entrance opening side.
Figure 5:
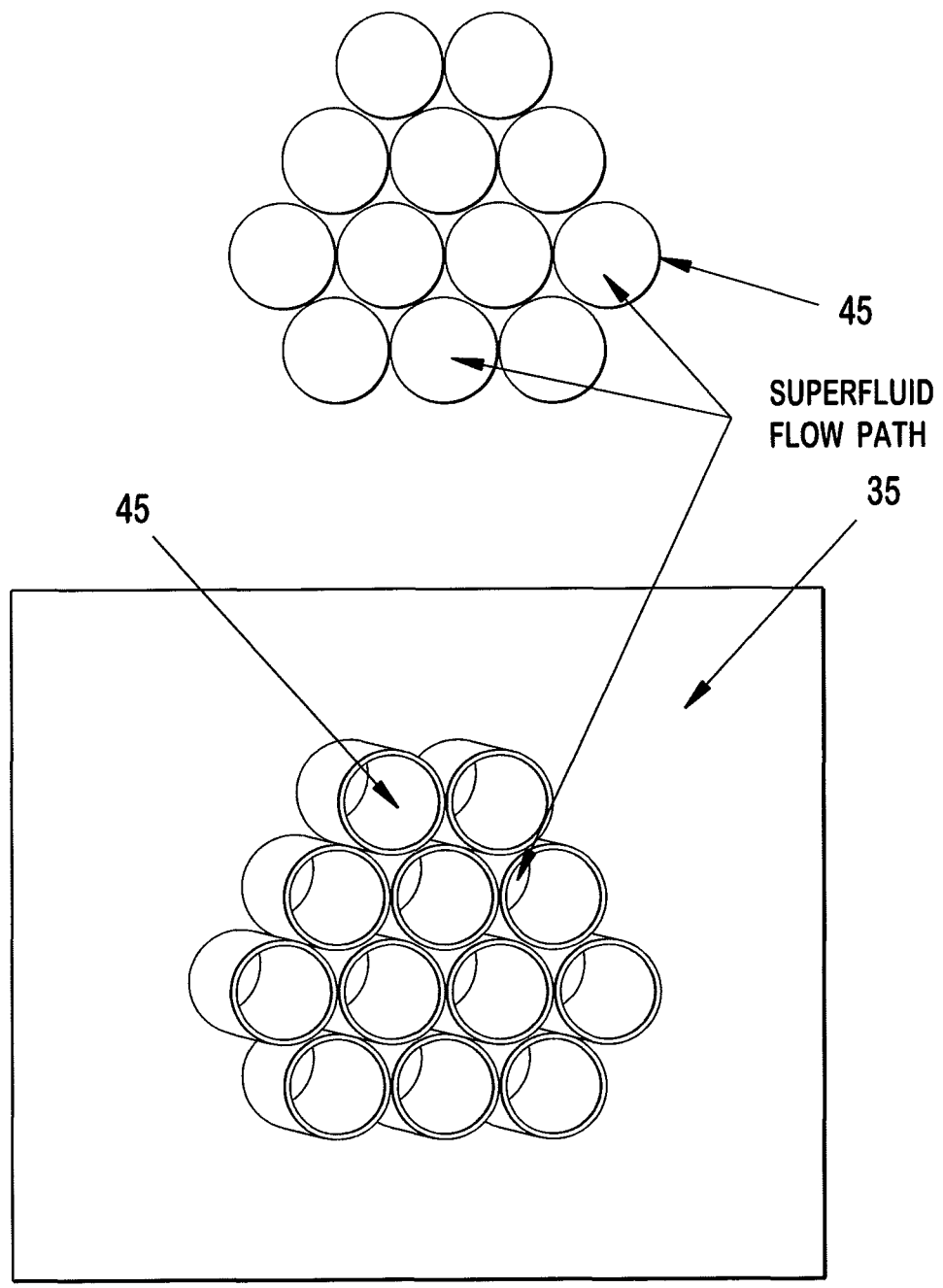
FIG. 5 depicts a schematic frontal view of the substrate having a matrix of nanotubes and showing a flow path for the superfluid.
Figure 6:
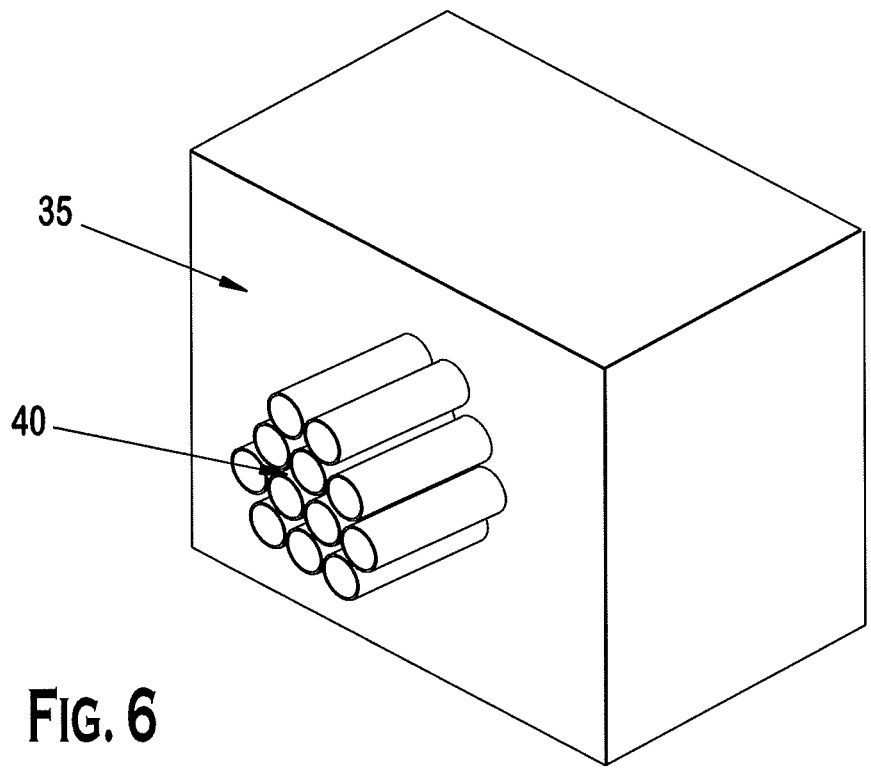
FIG. 6 depicts a schematic perspective view of the substrate having a matrix of nanotubes that is traversed by nanotubes.

FIG. 2 shows a perspective schematic view of the nanotubes 45 that are arranged together as CNT matrix 40, and FIGS. 3-6 show various perspective and plan schematic views of the CNT matrix 40 with the nanotubes integrated into a substrate 35. For example, FIG. 2 depicts twelve nanotubes 45 that are arranged adjacent to each other as a matrix 40, with entrance openings 47 on one side, and exit openings 48 on the other side. The substrate 35 provides support for the nanotubes. For representation purposes only, the nanotubes are shown with a length and diameter of comparable measure. In reality, to maximize Isp, the diameter of the nanotubes should be minimized, preferably under 10 nm, and the length is determined by the desired maximum Isp and how axial the expelled plume of He-II needs to be, for example 100, or 1000 nm. Moreover, FIG. 4 shows a schematic arrangement of the CNT matrix 40 with the nanotubes, with exit openings 48 arranged at a thruster side, and entrance openings 47 arranged in a bath of helium-4 superfluid 25. The basic operation of the HSISNP system 100 is the use of He-II and the CNT membrane 30 with their distinct properties in a synergetic effect. Specifically, a bath of helium-4 superfluid 25, when exposed to no other exit but a small orifice of a nanotube 45 and subjected to bath pressure in chamber 20, will "superleak" through the small orifice at a high rate.

This is because there is very low friction, or more accurately an analogue to friction, within the helium-4 superfluid 25 and between it any structure it is in contact with. In conventional fluid-dynamics, the smaller the orifice the fluid is forced through, the larger the effect of friction and, thus the larger the inefficiencies of that movement. However, with superfluid materials, there is an unexpected result that the smaller an orifice or a hole that a superfluid is forced though, the more efficiently the superfluid moves though that orifice or hole. Due to this severe lack of friction associated with helium-4 superfluid 25, it is possible to push superfluid 25 through very small holes, such as the orifices of the nanotubes 45, with a very high efficiency. Superfluidity is a property that some collections of particles can achieve at certain extreme conditions such as extreme low temperatures. The characteristic of superfluidity of importance to the present invention is the lack of any measurable viscosity and surface friction. There are however, many other properties of superfluids that result, such as, the thermomechanic effect, the mechanocaloric effect, the Josephson Effect, and the existence of quantized vortices, a Rollin film, etc., all of these properties being manifested at the full range of the superfluid phase, which for helium-4 superfluid is below a critical temperature of ~2.17K. None of these will greatly affect the system except the existence of quantized vortices.

The properties of helium-4 superfluid 25 specifically dictate that its flow rate be governed by many variables, such as, temperature, pressure differential across the orifice from the chamber 20 to upper area of thruster 50, orifice geometry, orifice material, orifice depth, initial condition of the bath of the helium-4 superfluid 25, including any initial turbulences, impurities, and wave propagations, and exposure to outside forces and energy such as, but not limited to, light, heat, sound, vibrations. These variables determine the equations governing the flow rate both below and above a critical velocity, and what the critical velocity is.

The propulsion system 100 according to the present invention has many applications, including, but not limited to, satellite propulsion, spacecraft orbit maintenance, spacecraft station keeping, spacecraft attitude control, spacecraft propulsion, space vehicle reaction control systems, spacecraft launch, space tourism, commercial space transportation, orbital rendezvous, spacecraft docking thrusters, asteroid and comet defense, asteroid and comet mining, deep space transportation, hypersonic commercial air transportation, guided missile propulsion, aerospace vehicle sustainer engine, modified scramjet engine, modified ramjet engine, space tether positioning rockets, high accuracy inertial guidance platforms, superconducting quantum interference device (squid) gyroscopes, neutral charge electric propulsion, satellite repair and maintenance, gravity well descent retrorockets, robotic sample return capsule propulsion, missile defense system propulsion, trajectory modification engine for gravitational propulsion, space based telescope pointing, momentum conversion system for nuclear propulsion. Moreover, if propulsion system 100 can achieve a sufficiently high exhaust velocity of the superfluid 25, another potential application of system 100 would be to use it as a device for sufficiently energizing a stream of atoms such that nuclear fusion occurs when the stream collides with some material or another stream generated by the system 100.

Figure 7:
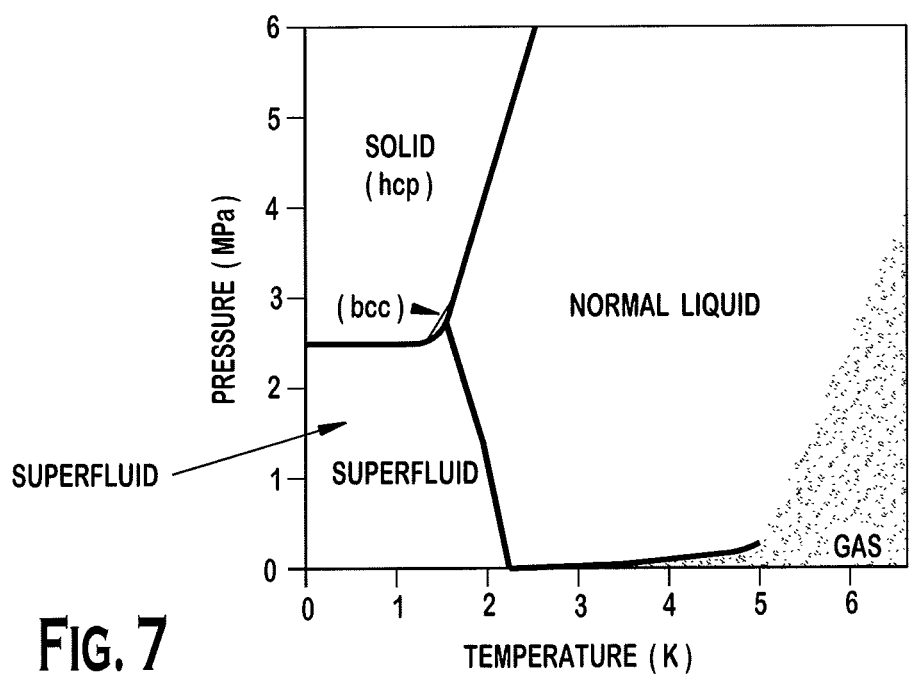
FIG. 7 shows a graph that shows physical characteristics of the superfluid including the temperature and the pressure.

FIG. 7 shows a graph representing a phase diagram of helium-4, illustrating the temperatures and pressures in which it is known to exist. For the present HSISNP system 100, helium-4 superfluid 25 can be used due to its specific physical properties. Helium-4 superfluid 25 is formed at critical temperatures at least hundreds of times hotter, at about ~2.17 K than other known or theorized superfluids such as helium-3 superfluid that has a critical temperature of 2.49 mK, and is, therefore, far easier to create and to maintain cooled than most other superfluids with insulation elements

70, 95. It is therefore possible that insulation elements 70, 95 can maintain the sealed container 20 below the critical temperature more easily when using the helium-4 superfluid 25.

Moreover, properties of helium-4 superfluid 25 include zero viscosity below a critical velocity, quantized flow defects above a critical velocity, critical velocities that are container dependent, very high thermal conductivity that varies with temperature, the transfer of nearly all or even all energy as quantized waves, the existence of a Rollin film that creeps over all surfaces to find a lower energy state, odd specific heat curves, quantized microscopic movement, such as in quantized vortices, vibrations, flow, etc., the mechanocaloric and thermomechanic effects, which translate movement with heat, and the Fountain Effect. In the proposed HSISNP system 100, what is of primary importance are those properties relating to fluid flow and critical velocities, though some other properties of helium-4 superfluid 25 have to be taken into account also. Carbon nanotubes are particularly suitable since they have smooth surfaces and form a cylindrical orifice, minimized orifice diameter, and can be manufactured to an optimized orifice length.

Figure 8:
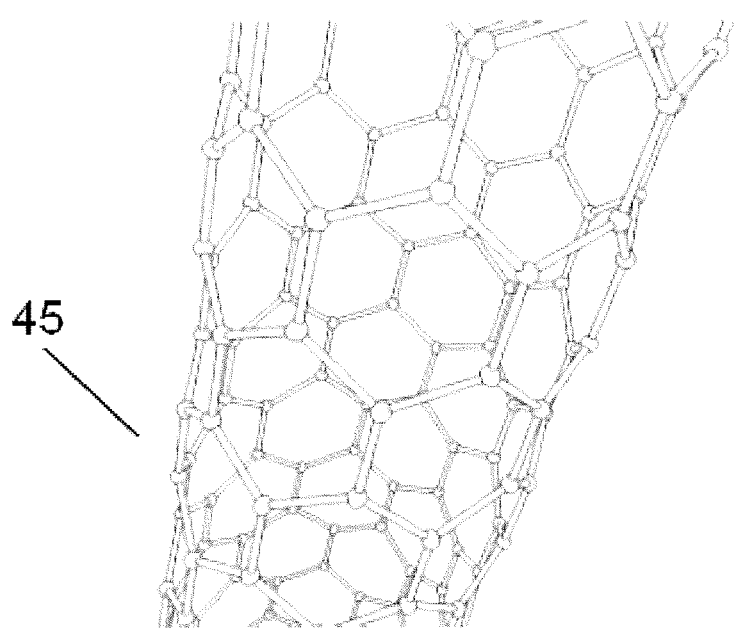
FIG. 8 shows a schematic representation of a carbon nanotube that is made of allotropes of carbon with a generally cylindrical nanostructure.
Figure 9:
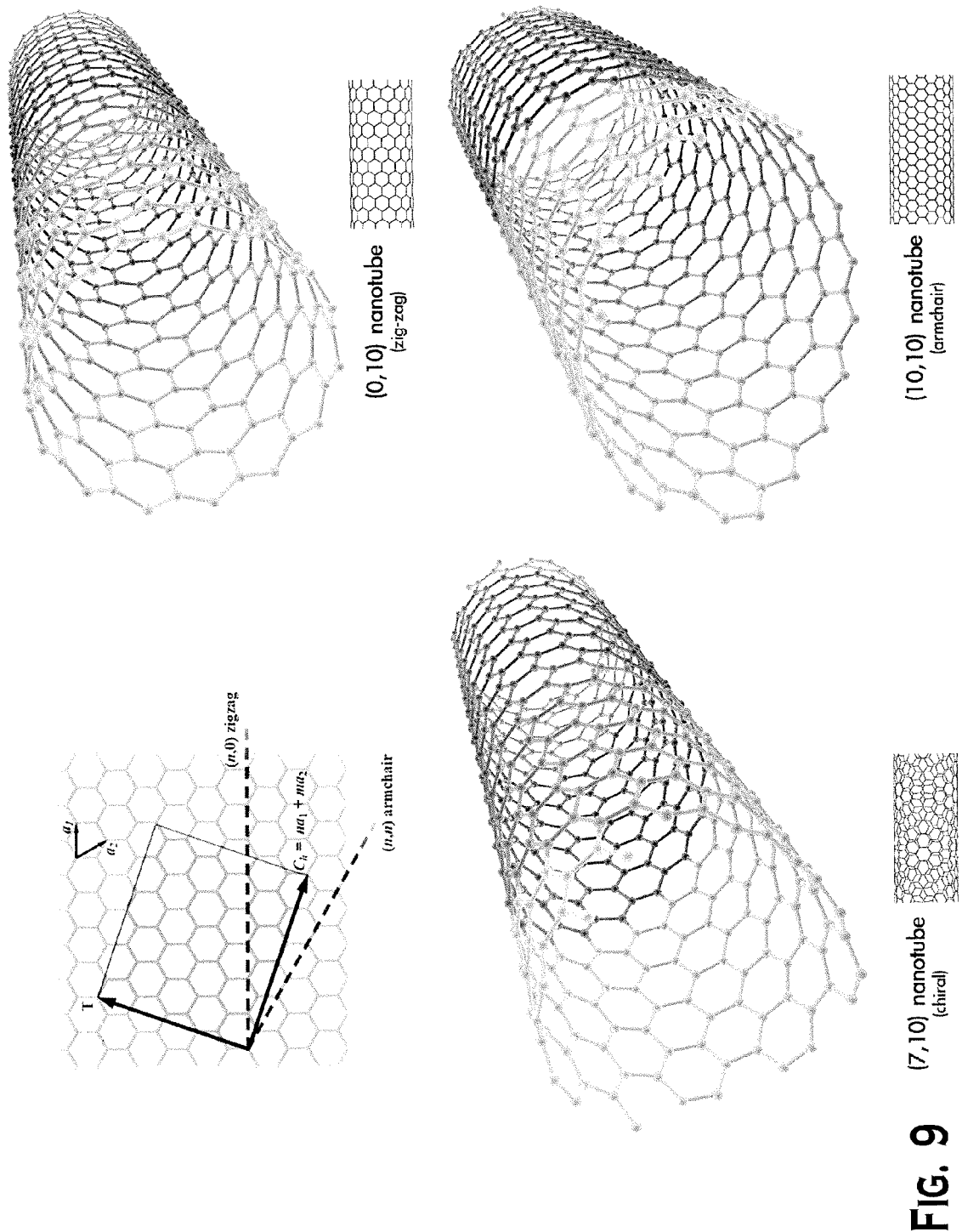
FIG. 9 shows a schematic representation of different types of nanotubes with different wrapping represented by a pair of indices (n, m)

FIG. 8 shows a schematic representation of a carbon nanotube that is made of allotropes of carbon with a generally or substantially cylindrical nanostructure, and FIG. 9 shows a schematic representation of different types of nanotubes with different carbon tube wrapping, wherein the carbon structure is shown defined by pairs of indices (n, m). One important aspect of the present invention is the use of the CNT membrane 30 for the HSISNP system having CNT matrix 40 of nanotubes 45. CNT nanotubes 45 in the matrix are allotropes of carbon with a cylindrical nanostructure. Nanotubes 45 are members of the fullerene structural family, and can be formed with a length-to-diameter ratio of up to 132,000,000:1. Also, the walls of nanotubes 45 are preferably formed by one-atom-thick sheets of carbon. These tubes 45 may or may not be capped, have splits, junctions, and different bonding layouts, but like fullerenes, are all one molecule. They have very high strengths, especially tensile strength, higher than any other known material, high oscillation frequencies, and high thermal and electrical conductivity along their length.

The helium-4 superfluid 25, when forced through the nanotube matrix discussed above, results in an easily accelerated fluid that can achieve speeds fast enough to be useful as part of a rocket propulsion system. By using the accelerated superfluid as the propellant, or as an expelled mass, of a rocket, it is possible to achieve specific impulses that are higher than the upper limit of chemical propulsion technology, with a very high maximum specific impulse. Also, it is possible to simultaneously expel an amount of superfluid that is at a mass flow rate comparable to chemical rocket engines. As such, the HSISNP system 100 described above has a greater specific impulse than most or all chemical rockets, and a greater mass flow rate, and thus thrust, than other high specific impulse alternatives such as electric propulsion.

Figure 10:
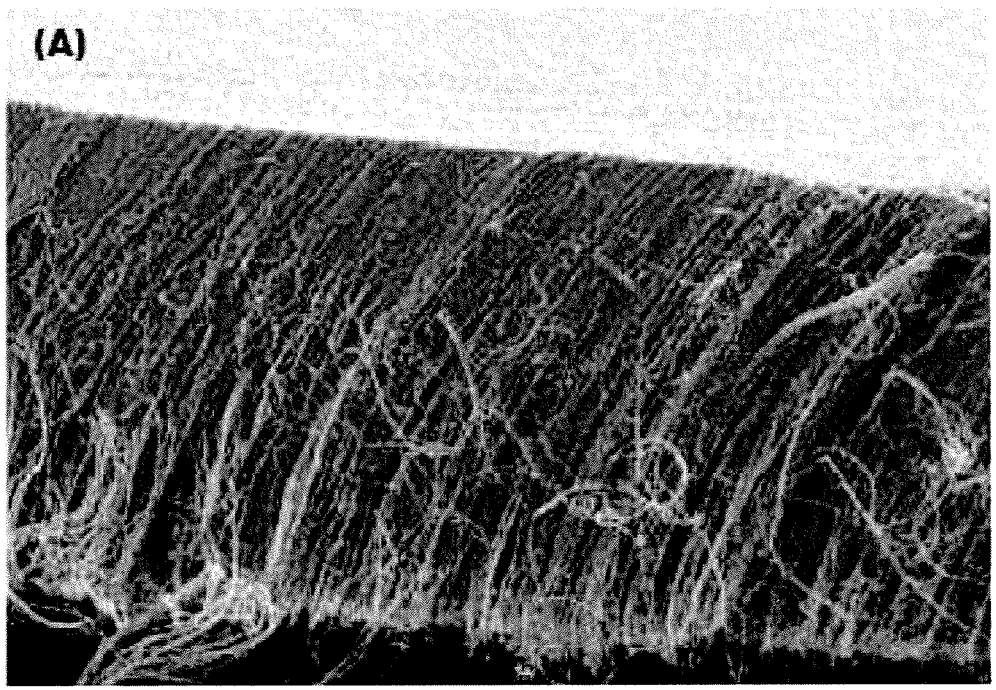
FIG. 10 shows a nanoscopic view of a dense arrangement of carbon nanotubes in a matrix that have been grown by a manufacturing method.
Figure 11:
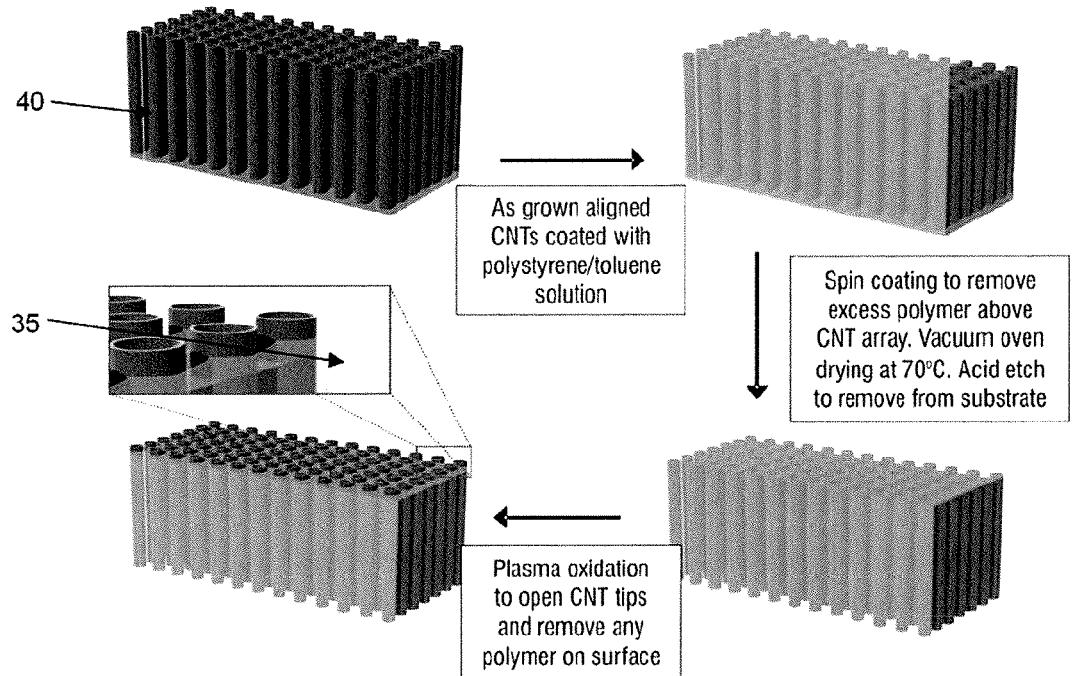
FIG. 11 shows a schematic representation of a method for manufacturing the substrate with the nanotubes matrix that can be used for the propulsion system.

FIG. 10 depicts a microscopic representation of dense nanotubes 45 in an array produced from a Fe-catalyzed chemical vapor deposition process. A method of manufacturing the CNT membrane 30 is illustrated in an exemplary embodiment in FIG. 11. In this method, membrane 30 consists of CNT nanotubes 45 arranged in parallel at a density of about 60 billion/$cm^2$ traversing a polymer film, having a length of about 5 μm. The CNT nanotubes 45 are grown by a chemical vapor deposition process (CVD). Next, the nanotubes are spin-coated using a polymer, for example polystyrene (PS) and Toluene, to form substrate 30, and the excess polymer is removed from the top surface. Then the quartz substrate is removed using Hydrofluoric (HF) acid. Finally, a thin layer of excess polymer is removed by a plasma etching process. Such exemplary method of manufacturing a nanotubes membrane is described in the publication entitled "Nanotube Membranes: Super Fast Flow in Very Small Pipes, Energeia," Rodney Andrews, Bruce Hinds, Vol. 17, No. 2, 2006, Center for Applied Energy Research (CAER), University of Kentucky, this reference being incorporated by in its entirely by reference. This method of producing CNT membranes 30 is only provided as an example, but many other methods of producing the CNT membrane 30 may be used. Also, the encasing material does not have to be polystyrene, other materials can be used that are more suitable for the application.

To create a propulsion system 100 using the carbon nanotubes described above and with superfluids as a propellant, a completely sealed chamber 20 is employed that is filled with helium-4 superfluid 25 and operated at or below a critical temperature of 2.17 K. 2.17 K is the approximate temperature at which liquid helium becomes or behaves as superfluid helium, as shown in FIG. 7. It must be noted that when dealing with any sort of container intended to store superfluid helium, the container must be completely sealed. That is to say that the container must not have any holes or any other material defects, including in any gaskets, flanges or seals, that penetrate through the container wall with a defect entrance diameter larger than a few hydrogen atom diameters. This is due to the fact that the superfluid will leak though any hole larger than the healing length of helium. In light of helium-4 superfluid's 25 ability to superleak, the proposed propulsion system 100 requires a specialized sealed chamber 20 to store and manipulate helium-4 superfluid 25 to avoid any stray leaks.

Figure 12:
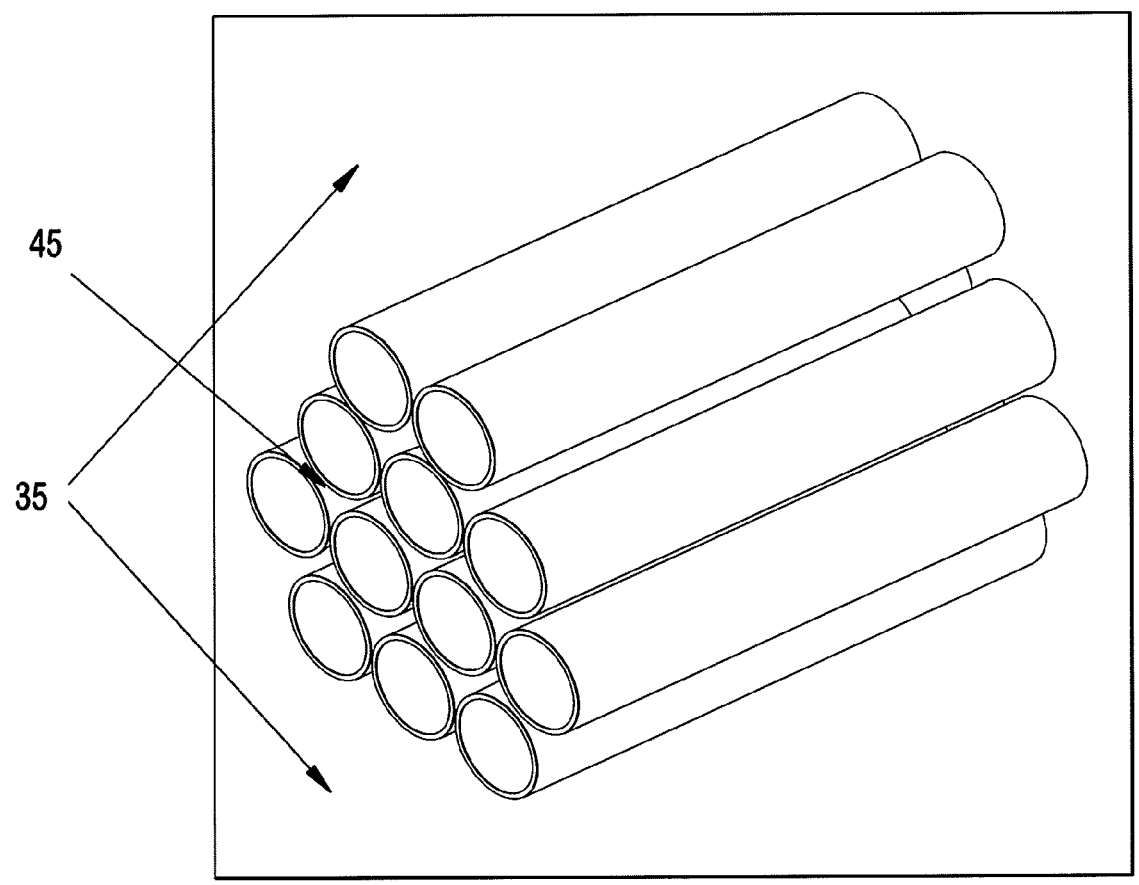
FIG. 12 shows a top side perspective view of a matrix of nanotubes.

The CNT membrane 30 with the CNT matrix 40 is located in the outlet of the sealed chamber 20. As discussed above, the CNT matrix 40 is composed of tens to hundreds of billions of preferably substantially vertically aligned single wall carbon nanotubes 45. The vertical and parallel alignment, with preferably substantially the same diameter and length, results in the tubes being oriented in substantially the same direction as shown in FIG. 12. Such an arrangement provides an efficient propulsion force out of the chamber. As discussed above, the carbon nanotubes are supported in a solid substrate composed of polymer material that is able withstand the propulsive forces generated during use, while maintaining the position of the nanotubes. The polymer also acts as an insulator for the nanotubes and a seal for the chamber opening. While a polymer has been discussed above, the material can also be metal, ceramic or an organic compound. The substrate 30 needs to be built to withhold forces, and the force that will need to be withstood by the membrane 30 will be inversely proportional to the frictional losses in the membrane 30 from transferring energy from the power supply 90 to the helium-4 superfluid 25.

In order to permit flow through the tubes, the CNT membrane 30 must not cover or obstruct either openings 47 and 48. Instead, it is envisioned in one embodiment that the substrate 35 encases the carbon nanotubes halfway between the carbon nanotubes top and bottom, as shown in FIGS. 3-4. In another embodiment, the membrane 30 is a flat plate with a matrix of holes in it, the matrix of holes being configured to hold individual carbon nanotubes 45. These holes have a diameter that is just ever so slightly larger than the diameter of the carbon nanotubes. Alternately, the holes may each be large enough to hold multiple nanotubes.

The substrate 35 holding the CNT matrix 40 is attached to the wall of the sealed chamber 20 in any one of numerous ways, including, but not to, through the use of adhesives, physical obstructions (e.g., flanges), clamps, magnets, etc.

Once the CNT matrix 40 is securely in place, a vacuum 55 may be establishes on the side of the CNT matrix 40 opposite of the sealed chamber 20. The purpose of this vacuum 55 is primarily to provide a physical property which results in the propulsion system having the same specific impulse regardless of its altitude and the environmental pressure. The vacuum 55 also serves to thermally isolate any potential comparatively hot atmosphere the propulsion system 100 may be in from the exit openings 48, which must be kept as cold as the superfluid 25. The power supply 90 is primarily used to pressurize chamber 20 to cause there to be a sufficient pressure differential or gradient to push the superfluid out of the chamber at a high speed. The vacuum 55 at the exit openings 48 can be created through the use of a mechanical vacuum pump (not shown) which is incorporated into the propulsion system 100 itself. When outer space, the ambient vacuum is sufficient to act as the vacuum 55, and no additional vacuum needs to be artificially generated. The vacuum 55 can be artificially generated, for example by incorporating channels or ducts 75 downstream from the exit openings 48. Moreover, ducts 75 can also be equipped with a fan or turbine 78 to accelerate the air flow through ducts 75 to further reduce the pressure. Vacuum pumps that are inside the fuselage could also be used (not shown). The channels 75 would produce an effect during atmospheric flight as air moves over the external surface of the rocket fuselage 10. The aerodynamic flow will create a low pressure area at the exit openings, aiding the vacuum pump in generating the vacuum 55.

As explained above, in order to accelerate helium-4 superfluid 25 through the nanotubes 45 themselves, a pressure differential or gradient must be established between entrance openings 47 and the exit opening 48 of the carbon nanotubes 45. The formation of the vacuum or low pressure zone on the downstream side of the nanotube matrix provides part of pressure differential. However, most of the pressure gradient originates from the pressurized helium-4 superfluid 25 by the application of pressure to the sealed chamber through the power source 90.

Considering the existence of this pressure gradient and the fact that there is a vacuum 55 on the exit side of the carbon nanotubes 45 and the inherent nature of superfluid to move though tiny holes and cavities with extreme ease, the superfluid in the sealed chamber 20 of the propulsion system will leave the chamber 20 the only way that it can, through the nanotubes 45 of CNT matrix 40. The empirical data regarding superfluids ease of movement though small capillaries coupled with the internal fluid flow properties of nanotubes 45 and the pressure differential, will result in the helium-4 superfluid 25 moving though carbon nanotubes 45, and exit openings 48 of nanotubes 45 with a very high exit velocity. Testing of fluid flow through carbon nanotubes by the University of Kentucky has shown volumetric flow rates that are, when exposed to a specific pressure differential, four to five orders of magnitude higher than expected using standard fluid dynamic theory. With carbon nanotube lengths of about 5 μm, 6-10 nm of inner diameter, end flow rates of up to 44 cm/s have been generated.

Calculation based on extrapolations of empirical data of He-II moving through holes of similar geometry as the diameters of the carbon nanotubes 45 according to the present invention indicate this velocity to be approximately 16,170 m/s, which equals a specific impulse of 1,650 seconds ((16,170 m/s)/(9.8 m/s2)=1,650 s). This calculation does not take into account the potential performance gained by using CNTs. By incorporating CNTs, as compared to the holes of similar dimensions, it is expected that the result will be higher, possibly four to five orders of magnitude higher as found with all other fluids. Most spacecraft propulsion systems that have an operating specific impulse that is on the order of 1,650 seconds are either electric propulsion systems, which do not create much thrust, or nuclear propulsion systems, which do have high thrust but they also very costly and may be problematic for the environment. One reason why traditional nuclear propulsion system concepts are not in common use is that most nuclear propulsion system concepts, either deliberately or though side effects of design and engineering, expel large amount of radioactive material as momentum transfer mass.

The present HSISNP system 100 presents substantial advantages over the existing propulsion system. For example, the system 100 is neither limited to the low thrust regime nor does it expel radioactive material even if it where powered with a nuclear power source. One of the reasons the system 100 can have such high performance is the large number of physical properties which, when studied either on a case by case basis or on a system wide level, turn out to be extremely efficient when operated in conjunction. For example, superfluids have no internal viscosity, and experience virtually no friction when they leak though small holes or capillaries. Superfluids move though small holes more easily the smaller the hole is, until the holes diameter is a few hydrogen atom diameters across. This is an unexpected result when looking at conventional fluid-dynamics. Moreover, carbon nanotubes 45 have extremely low internal friction, liquids moving though carbon nanotubes move up to five orders of magnitude faster than traditional fluid mechanic calculations would indicate. Hie critical velocities are increased with the smoother the orifice is. Therefore, the propulsion system 100 has the potential to be unrivaled in terms of total systematic efficiency in converting a potential energy into a propulsion force.

Moreover, the HSISNP system 100, and its integration into a fuselage or spacecraft, can provide substantial advantages over the pre-existing propulsion solutions. In use, a spacecraft would be equipped with a suitable charged power supply for providing the pressure needed. A sealed chamber 20 in the fuselage is filled with helium-4 superfluid. The spacecraft can safely sit on a runway awaiting launch. Next, a computer located at a base station sends a signal controller 60 to start using the power supply 90 to pressurize the chamber 20. As the pressure builds within the chamber, pressured helium-4 superfluid can be allowed to be released though the CNT matrix 40 to generate thrust. At this time, the controller 60 can control the superfluid valve system 80 to allow flow of superfluid 25 through the CNT matrix 40. As superfluid 25 is ejected out of the propulsion system 100 through the thruster 50, a thrust force is generated. This thrust and total duration of propulsion is sufficient to cause the spacecraft to reach low Earth orbit in a single stage. While on a mission the superfluid 25 probably can be kept at the critical temperature 2.17 K or below with an appropriate combination of insulation 70, 95 and also a cooling system for the duration of the mission.

Based on the estimations, it is possible that a spacecraft that is equipped with the propulsion system 100 can reenter the Earth's atmosphere without the need to use a heat shield. Generally, there is no inherent need for reentering spacecraft to have a heat shield. Heat shields are used solely to bleed off the enormous kinetic energy that a spacecraft in Earth's orbit needs in order to sustain orbit. Effectively, current spacecraft use their rocket engines to accelerate from 0 kph to orbital velocity of 36,000 kph and then run out of fuel. When it is time to return to Earth, the spacecraft use aerodynamic effects between Earth's atmosphere and the spacecraft's heat shield to convert the enormous kinetic energy of orbital velocity into heat that is dissipated and dispersed throughout the atmosphere. The avoidance of a heat shield will reduce your payload mass fraction. With a high performance spacecraft propulsion system, such as the one proposed herewith, the spacecraft can use its rocket engines while in orbit to nullify its orbital velocity so that it can fly back to the spaceport in a more controlled manner. As stated previously, the superfluid 20 that is proposed as a propellant for the HSISNP system 100 is not an energy source. In order to use it as a propellant, it must be supplied with energy through some other means. This is part of the reason that the HSISNP system 100 can span such a large range of specific impulses and thrust, which fundamental parameters will depend on the type of power supply 90 that is used in the system. In general the most important parameter for a power supply 90 is the energy density per mass of the power supply 90, including reactant masses and structural requirements. There are a number of options for powering the proposed propulsion system 100. For example one could use a standard exothermic reaction to power a turbine and energize (pressurize) the superfluid propellant.

Some chemical compositions that could produce this exothermic reaction are, but are not limited to, liquid Hydrogen and liquid Oxygen, Lithium and Fluorine (preferably solid), Kerosene and Oxygen, Iron Oxide and Aluminum (Thermite), Aluminum and Oxygen, Magnesium and Oxygen, Hydrogen Peroxide dissociation, Hydrazine dissociation, Nitrous Oxide and Rubber, and Aluminum Perchlorate Composite Propellant. As these are all chemical reactions, they all have comparable energy densities (~3-40 MJ/kg), so choosing one reaction over another would likely be predicated on other secondary factors. Another possible chemical power supply that could be used would be an air breathing hydrogen engine, this would have a higher than average energy density (~143 MJ/kg) for a chemical power plant. Such a power plant would not require the storage of an oxidizer. An air breathing chemical power supply is believed to be the upper limit of energy densities that can be obtained via chemical reactions and carries with it some well understood engineering limitations. Such power supply should be thermally isolated from the sealed chamber.

The previously listed power supply sources all rely on electromagnetic force interactions, another category of power supplies would be those which use strong force reactions. Strong force intentions are inherently more energy dense than electromagnetic force interactions and, therefore, have the potential to be beneficial in the present invention. A variety of nuclear reactors could be used as a power supply 90. These include standard Uranium 238 fission, light water reactors, and fast breeder reactors. Some less standard nuclear reactors could also be considered: Thorium cycle fission, and Uranium-Zirconium-Hydride fission (TRIGA). These two examples are unique in that they enjoy a negative temperature reaction coefficient, meaning that it is physically impossible for them to meltdown in the traditional sense. These options have energy densities ranging from 10,000,000 to 100,000,000 MJ/kg. Another strong force option is Induced Gamma Emission where nuclear isomers store energy in specific excitation states, this can be done relatively safely with about 5 nuclear isomers boasting energy densities as high as 1,000,000 MJ/kg. This is a useful energy density and, since Induced Gamma Emissions does not involve the creation of radioisotopes, is, therefore, generally safer than most other strong force interactions. All in all choosing a power source 90 is highly dependent upon the specific use of the propulsion system 100.

The advantages of the HSISNP system 100 over the existing propulsion systems are many, as already discussed in some detail above. One significant feature of the propulsion system 100 is that it uses He as the propellant, while most existing propulsion systems use highly volatile chemicals in a combustion process. In addition, the byproduct of the propulsion system is He which is a noble gas and, therefore, non-toxic, environmentally friendly, non-corrosive, not a greenhouse gas, and non-combustible. In addition, the chamber 20, which is filled with liquid He, is inherently safer compared to propulsion systems that use traditional chemical explosion. In other words, since He is an inert gas, the present invention generally will not be susceptible to exploding via an exothermic chemical reaction. Another way to explain this is to say that liquid He likes the state it is in, and it will not phase change or otherwise chemically react besides through normal thermal evaporation which is a generally much less energetic process.

Another advantage of propulsion system 100 is that it uses a subsystem of liquid He pressurization and storage devices and a nozzle like subsystem, both of which are small in mass and volume. The decrease in the size, mass, and volume of the propulsion system 100 can reduce the size, mass and volume of the fuselage 10 and the space vehicles themselves. As should be apparent, generally small spacecrafts cost less. Also, the He based superfluid is easy to transport, store, and is relatively inexpensive as compared to other propellants.

Still another advantage of the propulsion system 100 is that, as discussed above, it has a high specific impulse (high fuel efficiency performance). This means that a launch vehicle using our superfluid propulsion system can send more payload mass to a destination while at the same time using less propellant than current rocket systems. The advantage will reduce the cost of access to space and increase the market share using the propulsion system. One reason why the system 100 has a high specific impulse is that superfluid helium and other superfluids have, by definition, no internal viscosity (under certain conditions). This means that when superfluids flow through or around physical objects or obstructions, the superfluid does not slow down due to viscous drag. Therefore, when the system 100 forces superfluid helium through very small holes, the superfluid will be accelerated without much, if any, efficiency losses.

The superfluid expelled is naturally collimated, as such, using vector mechanics, it can be established that the collimated stream imparts substantially all of its momentum exactly in the desired vector or direction. Such a well-directed propulsive stream out of a thruster 50 is not at all common in the existing propulsion systems where the vast majority suffer some noticeable thrust vector propulsion efficiency loss.

Another reason the propulsion system 100 has a high specific impulse is that the ejected superfluid helium is around 2 degrees Kelvin. As such, the ejected fluid has very little internal energy, other than its quite large kinetic energy. This lack of inefficiently-used internal energy, in turn, means that the ejected working fluid does not have any tendency to adiabatically expand. The lack of adiabatic expansion simplifies the thermal engineering analysis and decreases thrust losses due to vector mechanics effects that are epiphenomena of adiabatic expansion.

Still another reason why the propulsion system 100 has a high specific impulse is that carbon nanotubes 45 have a property of extremely efficient internal fluid transfer. Another advantage of the propulsion system 100 over existing electric propulsion systems is that it does not eject charged particles. The ejection of charged particles is disadvantageous since, unless it is counteracted, the expelled charged particles can change the electric charge of the spacecraft itself. Moreover, the use of super-cold superfluid He combined with the use of carbon nanotubes 45, results in relatively little frozen flow.

Yet another advantage of the propulsion system 100 is that through the use of carbon nanotubes 45, the superfluid propellant can be forced though otherwise unattainably small holes. Due to a higher critical velocity of superfluity when the superfluid traverses a hole or orifice of a very small diameter, the superfluid moves more efficiently through that hole. This fact adds to the overall efficiency and specific impulse of the propulsion system 100.

Still another advantage of the propulsion system 100 is that the nozzle, as compared with chemical propulsion systems, is composed of carbon nanotubes which are extremely strong, and relatively inexpensive to grow. Yet another advantage is that if an engineer chooses to use a nuclear reactor as a power source 90, the exhaust stream would not be radioactive.

Yet another advantage of the propulsion system 100 is that it can be restarted, effectively, an infinite number of times, without the need to wait for more optimal operating temperature for the chemical reactions. Existing chemical reaction based propulsion systems cannot be restarted; some like the J-2 liquid-fuel cryogenic rocket engine used on NASA's Saturn IB and Saturn V launch vehicles can only be restarted every 90 minutes, or it may be possible to attempt a restart after 35 minutes if the operator wants to risk an explosion. The present invention does not require this much time to restart, and the restart time is not inherent in the superfluid; it depends on the power supply, the valves, etc., all of which are interchangeable.

Still another advantage of the propulsion system 100 is that it has both a sufficiently high thrust and high specific impulse so that it is possible for an aircraft that is equipped with system 100 to avoid the need of a heat shield for reentry. This is possible because, if a spacecraft has an advanced high-performance rocket engine then the spacecraft can use its rocket engine to decelerate instead of using the aerodynamic effects of a traditional heat shield moving though the atmosphere. Yet another advantage of the proposed propulsion system 100 is that there is no need for multiple propulsion stages, thus reducing the weight of the vehicle, and permitting a more efficient flight trajectory. In other words, system 100 has sufficient power, thrust, and specific impulse to allow for the construction of single-stage-to-orbit vehicles that are fully reusable. Such a single-stage-to-orbit vehicles should be less expensive to operate than traditional multi-stage expendable rockets, or partially reusable spacecrafts such as NASA's Space Shuttle. Another advantage of the proposed propulsion system 100 is that its performance versus cost ratio can be sufficiently economical to allow for traditional high-performance jet planes, such as corporate jets, supersonic transports, military assets, to use the proposed propulsion system 100 as a thrust source, instead of traditional turbines. The proposed system 100 could also well be used for propelling other vehicles and devices.

Another advantage of the propulsion system 100 is that its specific impulse, unlike most current technology, does not reduce with decreased atmospheric altitude. In other words, for most existing propulsion systems, the specific impulse increases at high atmospheric pressure, for example at lower altitudes, and use nozzles which are engineered to perform at maximum efficiency only at a certain altitude or atmospheric pressure. As an example, consider the Space Shuttle Main Engine's performance (SSME) data. The SSME produces 2,278,824 Newton's of thrust at a specific impulse of 452 seconds while in a vacuum, and a thrust of 1,859,357 Newton's of thrust at a specific impulse of 366 seconds while at sea level. Considering what is available in existing propulsion systems, it is advantageous that the propulsion system 100 has a specific impulse in a vacuum Isp (vac) that is always the same regardless of the environmental pressure. The reference to the specific impulse Isp in vacuum is based on the assumption that propulsion system 100 is thrusting into a vacuum at all times. The motivation for operating propulsion system 100 in vacuum is to thermally insulate the very cold helium-4 superfluid 25 from the local environment, and a useful side effect is that we are always thrusting into a vacuum. Because we are always thrusting into a vacuum, the local external (atmospheric) pressure does not matter and our performance therefore not be changed by different pressures at different altitudes.

Another advantage of the propulsion system 100 is that a reusable spacecraft that uses it can be easily, quickly, safely, and relatively inexpensively refueled. This property makes this propulsion system 100 very attractive to commercial spaceflight launch, space tourism launch providers, as well as other organizations and individuals.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A propulsion device comprising:
   a chamber storing a pressurized superfluid, the chamber having an outlet;
   a support mounted in the outlet of the chamber;
   a plurality of orifices extending through the support, each of the plurality of orifices having a first end and a second end on an opposite side of the orifice from the first end, the first end disposed in the interior of the chamber and the second end disposed outside the chamber; and
   a pressure source adapted to generate a pressure differential between the first end of each of the plurality of orifices and the second ends of each of the plurality of orifices, each of the first end receiving pressurized superfluid such that pressurized superfluid flows through the plurality of orifices toward each of the second end so that superfluid imparts thrust at each of the second end.

2. The propulsion device according to claim 1, wherein the plurality of orifices are carbon nanotubes.

3. The propulsion device according to claim 1, wherein the chamber is configured to maintain a temperature of an inside of the chamber below a critical temperature for superfluidity.

4. A propulsion system comprising:
   a chamber that stores a pressurized superfluid;
   a substrate coupled to a portion of the chamber;
   a plurality of nanotubes coupled to the substrate, each of the plurality of nanotubes having a first end and a second end opposite the first end, the first end disposed near an interior of the chamber and the second end disposed near an exterior of the chamber; and
   a pressure source that generates a pressure difference between the first end of each of the plurality of nanotubes and the second end of each of the plurality of nanotubes, each first end receiving pressurized superfluid such that pressurized superfluid flows through the nanotubes toward each second end so that superfluid imparts thrust at each second end.

5. The propulsion system according to claim 4, wherein the chamber is configured to maintain a temperature of an inside of the chamber below a critical temperature for superfluidity.

6. A method of propulsion comprising:
provinding a plurality of orifices in an outlet of a chamber, the orifices each having a first end located within the chamber and a second end located outside the chamber;
providing in the chamber a superfluid that has substantially no viscosity;
pressurizing the superfluid within the chamber; and
providing the pressurized superfluid to the first ends of each orifice, such that superfluid flows through each of the orifices towards the second end and the superfluid imparts thrust at the second end of each of the orifices.

7. The method of propulsion according to claim 6, further comprising:
maintaining a temperature of an inside of the chamber below a critical temperature for superfluidity.

8. The propulsion device according to claim 6, wherein the plurality of orifices are carbon nanotubes.

* * * * *